United States Patent Office 3,639,580
Patented Feb. 1, 1972

3,639,580
ANTIBIOTIC TUBERACTINOMYCIN AND PROCESS FOR PREPARING SAME
Akio Nagata, 421–1 Ohito, Ohito-cho, Tagata-gun; Takuji Ando, 744 Yoshida, Ohito-cho, Tagata-gun; Rokuro Izumi, 632–1 Mifuku, Ohito-cho, Tagata-gun; and Hideo Sakakibara, 6–3 Taisha-cho, Mishima-shi, all of Shizuoka-ken, Japan
Continuation of application Ser. No. 766,820, Oct. 11, 1968. This application Jan. 8, 1970, Ser. No. 3,584
Int. Cl. A61k 21/00
U.S. Cl. 424—116
5 Claims

ABSTRACT OF THE DISCLOSURE

A new antibiotic of basic peptide Tuberactinomycin and the manufacturing process thereof which comprises the steps of: cultivating Streptomyces griesoverticillatus var. tuberacticus NRRL 3482 or equivalents thereof in a nutrient culture medium; cultivating the said culture medium aerobically until substantial antibiotic activity is imparted to said medium; isolating the said antibiotic from the culture medium; obtaining the said antibiotic in its essentially crystalline powder having an antituberculosis activity.

This application is a continuation of Ser. No. 766,820 filed Oct. 11, 1968, now abandoned.

This invention relates to a new antibiotic and the process for manufacturing the same. More particularly, it is concerned with a novel antibiotic agent, herein designated tuberactinomycin, a process for its production by fermentation, and processes for its recovery from fermentation broths.

It has heretofore been reported that there are a large number of antibiotics produced by soil microorganisms, especially genus Streptomyces. Some of these antibiotics have been clinically applied as an antituberculosis agent, such as streptomycin, kanamycin, cycloserine, viomycin and the like. However, recently, strains of tuberculous bacilli resistant to these antituberculosis antibiotics have frequently appeared and have caused serious difficulty in tuberculosis therapy.

The inventors of the present invention have investigated a new antituberculosis antibiotic produced by a microorganism belonging to genus Streptomyces, and have found that a strain belonging to a species of Streptomyces, separated from a soil sample from Ohito-cho, Shizuokaken, Japan, produced a new and novel antibiotic, designated as tuberactinomycin, mainly active against tuberculous bacilli. Further the inventors discovered a process for the production of the said antibiotic tuberactinomycin, then determined its chemical and biological properties, and thus applied for tuberculous infections as a chemotherapeutic agent.

It is a main object of the present invention to provide a clinically useful novel antituberculosis antibiotic herein designated tuberactinomycin.

It is another object of the present invention to provide an industrially advantageous process for the production of the said novel antibiotic.

These and other objects, features and advantages of the present invention will become more apparent to any person skilled in the art upon reading the more detailed description set forth hereinbelow, in connection with the accompanying drawings, in which.

Figure 1:
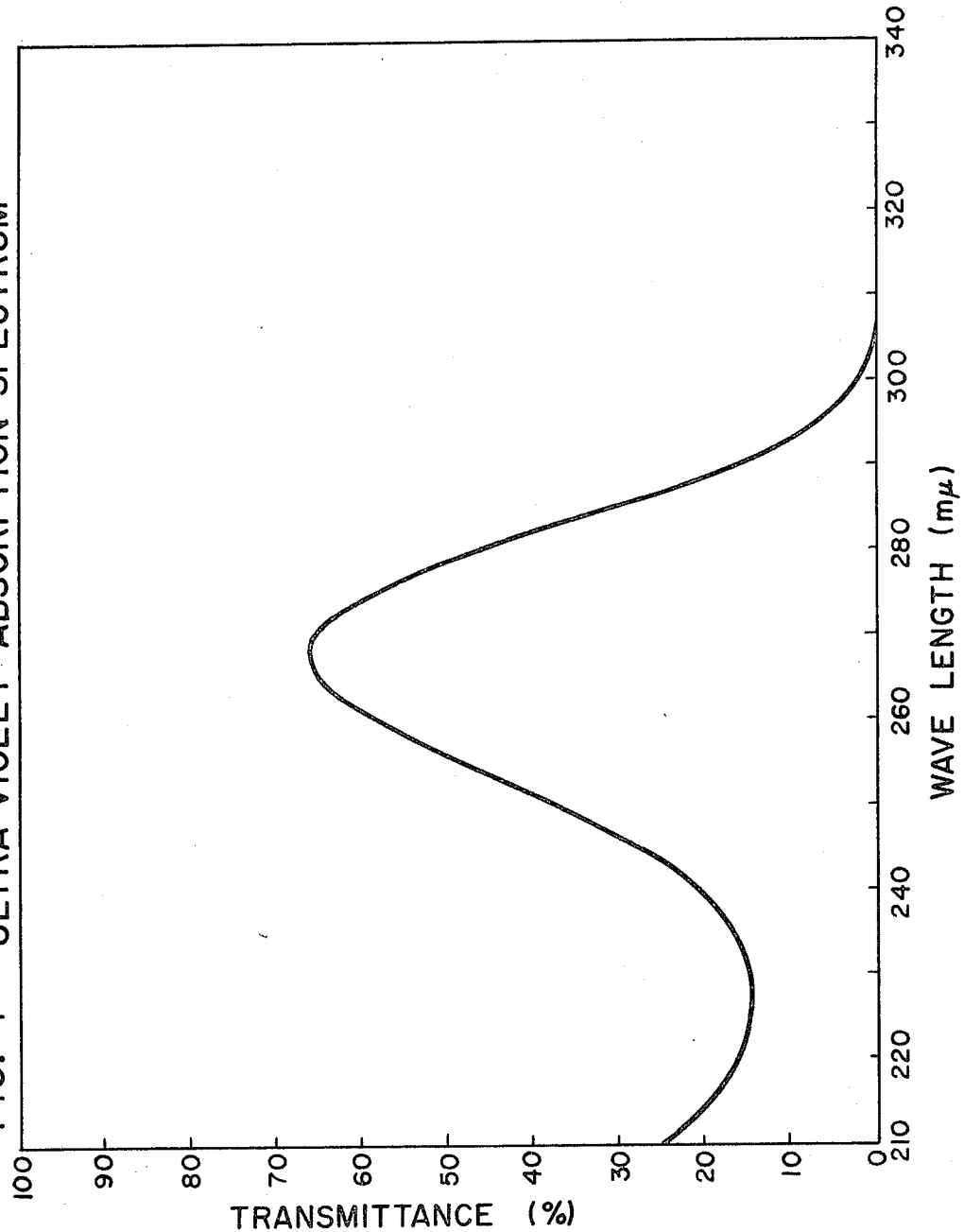
FIG. 1 is a chart showing the ultraviolet absorption spectrum of tuberactinomycin hydrochloride.

The new antibiotic called tuberactinomycin is formed, in accordance with one embodiment of this invention, during the cultivation under controlled conditions by the tuberactinomycin producing microorganism belonging to Streptomyces, preferably a previously unknown strain of Streptomyces called by the inventors Strain B–386 or equivalent thereof.

These strains are related morphologically to Streptomyces griseoverticillatus [refer to Sheinobu et al., Bot. Mag. Tokyo, 75, 170 (1962)] but showed different cultural and physiological characteristics as hereinbelow described, and so these tuberactinomycin-producing strains are herein referred to as Streptomyces griseoverticillatus var. tuberacticus.

The following is a general description of taxonomical properties of the organism Streptomyces griseoverticillatus var. tuberacticus, formerly called Streptomyces Strain B—386, based on the diagnostic characteristics observed.

(1) The cultural characteristics are set forth in the Table I.

TABLE I

| Medium | Characteristic studied |
|---|---|
| Czapek-Dox. agar | G: Good.<br>AM: Good, white to pearl pink (3ca) or light rose beige (4ec).<br>SM: Light wheat (2ea) or bamboo (2gc).<br>SP: None. |
| Asparagine glucose agar | G: Moderate.<br>AM: Moderate, white to shell pink (5ba) or fresh pink (5ca), many droplets.<br>SM: Sometimes intruding into medium, pearl pink (3ca)-bisque (3ec).<br>SP: None. |
| Bennett's agar | G: Good.<br>AM: Good, white to fresh pink (4ca) to light rose beige (4ec), cottony, droplets.<br>SM: Bamboo (2gc) to gradually darkened to light brown (4ng).<br>SP: None. |
| Bouillon agar | G: Poor.<br>AM: None.<br>SM: Nearly colorless to putty (1½ec).<br>SP: None. |
| Calcium malate agar | G: Moderate.<br>AM: White to bisque (3ec).<br>SM: Poor growth, pearl-shell tint (3ba).<br>SP: None. |
| Gelatin medium ¹ | G: Very poor.<br>AM: None.<br>SM: Light brown (4ng) or cocoa brown (5lg), slight liquefaction.<br>SP: None. |
| Löffler's serum | G: Moderate.<br>AM: None.<br>SM: Light wheat (2ea) or bamboo (2gc), with opalescence, no haemolysis.<br>SP: None. |
| Starch agar | G: Moderate.<br>AM: Good, white to fresh pink (4ca)-light rose beige (4ec).<br>SM: Sometimes intruding into the medium, fresh pink (4ca)-light rose beige (4ec).<br>SP: None. |
| Potato plug | G: Moderate.<br>AM: Laterly covered with white mycelia.<br>SM: Wrinkled growth, light wheat (2ea).<br>SP: None. |
| Carrot plug | G: Moderate.<br>AM: Laterly covered with white mycelia.<br>SM: Lustrous colorless, light wheat (2ea).<br>SP: None. |
| Egg medium | G: Good.<br>AM: White to pearl (2ba).<br>SM:<br>SP: None. |

TABLE 1—Continued

| Medium | Characteristic studied |
|---|---|
| Milk medium | G: Moderate.<br>AM: Moderate, white to light wheat (2ea) or bisque (3ec).<br>SM: Ring forming at surface, no coagulation and no peptonization.<br>SP: None. |
| Cellulose | G: None. |
| Tyrosine agar | G: Moderate.<br>AM: Very poor.<br>SM: Light wheat (2ea)-cinnamon (3le).<br>SP: None. |
| Urea-glycerol agar | G: Good.<br>AM: White to light beige (4ec), cottony, covered with many droplets.<br>SM: Light wheat (2ea)-light spice brown (4lg).<br>SP: Almost absent or light putty (1½ec) or ecru (2ec). |
| Oatmeal agar | G: Good.<br>AM: White to light rose beige (4ec), water droplets.<br>SM: Pearl pink (3ca or 4ca).<br>SP: None. |
| Potato glucose agar | G: Good.<br>AM: Light rose beige (4ec), water droplets.<br>SM: Light amber (3ic)-cinnamon (3le).<br>SP: None. |
| Glucose bouillon | G: Good.<br>AM: None.<br>SM: Nearly colorless mycelia lumps on the bottom.<br>SP: None. |

[1] Incubated at 24° C.

Characteristics were observed, except in experiment with gelatin medium, at 30° C., 10 days' cultivation.

The descriptions of colors were taken from "Color Harmony Manual" (Container Corp. of America, 1958) and observed at north daylight.

In Table I, G means Growth, AM means Aerial Mycelium, SM means Substrate Mycelium, and SP means Soluble Pigment.

(2) Structure of spore bearing hyphae:

An aerial mycelium is produced well in many media, and many primary and secondary whorls having a straight or flexuous forms are observed.

(3) Structure of spores:

By an electron microscopical observation, spores are smooth surfaced, long elliptical or cylindrical, 0.8 to 1.8μ x 0.5 to 0.7μ.

(4) Colors of mycelium:

Color of aerial mycelium in many media is white at beginning, changes gradually to pink or beige color. Sometimes covered with water droplets. Color of substrate mycelium is generally yellowish brown or pale brown.

(5) Soluble pigment:

No soluble pigment formation is observed in the medium tested except light putty or ecru color in urea-glycerin medium.

(6) Physiological characteristics:

(a) Liquefaction of gelatin: Very poor growth, positive liquefaction
(b) Starch hydrolysis: Positive hydrolysis
(c) Nitrate reduction: None
(d) Peptonization of milk: Hardly observed
(e) Cellulose decomposition: None
(f) Production of $H_2S$: None
(g) Haemolysis: Negative
(h) Melanin pigment formation: None (7) Utilization of carbon sources:

Glucose, sucrose, lactose, maltose, starch, dextrin, glycerin, mannose and inositol: Utilized.

(8) Colony:

Giant colony shows a chrysanthemum-like shape, and covered with cottony mycelia.

Compared with the taxonomical characteristics of the said Streptomyces hereinabove described and the known other species of Streptomyces resemble the said strain of this invention, in respect of typical whorls formation and similarities of cultural characteristics, it may be mentioned as follows: *Streptomyces hachijoensis, Streptomyces mashuensis, Streptomyces albireticuli, Streptomyces griseoverticillatus* and *Streptomyces alboverticillatus*.

In comparison with the taxonomical properties between this Streptomyces Strain B–386 and the other antibiotic-producing Streptomyces as shown above, they are apparently differentiated as follows:

(a) *Streptomyces albireticuli* is differentiated from Streptomyces Strain B–386 that the former shows a spiral secondary whorl, yellowish or brownish white aerial mycelium on glucose-asparagine agar, positive nitrate reduction and hydrogen sulfide production.

(b) *Streptomyces mashuensis* is differentiated from Streptomyces Strain B–386 that the former shows yellow or yellowish green growth of Czapek agar medium.

(c) *Streptomyces alboverticillatus* shows colorless or white colored growth on many kind of media and white colored aerial mycelium, whereas Streptomyces Strain B–386 shows a brownish growth, white to pink or light reddish brown colored aerial mycelium.

(d) *Streptomyces hachijoensis* resembles Streptomyces Strain B–386 in the point of pink or light reddish brown colored growth on many kind of media, however, the former strain shows white colored aerial mycelium, positive haemolysis and dark colored changes of blood agar medium, yellow to brown colored growth, pink to orange colored soluble pigment formation, and antifungal antibiotic Trichomycin production, whereas the latter strain produces no Trichomycin.

(e) The following table illustrates the characteristic differences between Streptomyces Strain B–386 and *Streptomyces griseoverticillatus*.

| | Streptomyces Strain B-386 | Streptomyces griseoverticillatus |
|---|---|---|
| Antibiotic elaborated | Tuberactinomycin (peptide) | Takacidin (nonpeptide). |
| Urea-glycerol agar | SP: None or light putty or ecru | SP: Light brown or light grayish brown. |
| Milk medium | Negative peptonization | Positive peptonization. |
| Organic media (Bennett's-, Czapek-, potato glucose, oatmeal, urea glycerol-agar, etc.). | AM: Good, cottony growth many droplets. | AM: Not remarkably observed. |

These two strains resemble remarkably in other taxonomical characteristics such as physiological properties and morphological properties on many kind of media, etc., therefore, these strains are not remarkably differentiated as different species of Streptomyces. So this tuberactinomycin-producing strain, Streptomyces B–386 is herein referred to as *Streptomyces griseoverticillatus* var. *tuberacticus*, and has been deposited at Fermentation Research Institute, Agency of Industrial Science & Technology, Ministry of International Trade & Industry, Japan, and added to its permanent culture collection, as a deposit number KOHATSUKENKINKI No. 45, further, this strain was also deposited at United States Department of Agriculture, Agricultural Research Service, Northern Utilization Research and Development Division, and added to its deposit number as NRRL 3482.

Above-described *Streptomyces griseoverticillatus* var. *tuberacticus* is only illustrative as the microorganisms usable in this invention, and the present invention also contemplates the use of other tuberactinomycin-producing strains belonging to genus Streptomyces.

According to this invention, tuberactinomycin is produced by inoculating a suitable nutrient medium with tuberactinomycin-producing Streptomyces, for example *Streptomyces griseoverticillatus* var. *tuberacticus,* incubating the mixture under the conditions usable in common antibiotic production, then isolating the antibiotic from the culture medium. The cultivation of the microorganism can be carried out in a number of different ways such as liquid culture or solid culture. The most profitable way for industrial production of tuberactinomycin is submerged aeration culture process.

Nutrient media which are useful for the production of tuberactinomycin may include an assimilable source of carbon such as glucose, sucrose, lactose, maltose, starch, dextrin, molasses, glycerin, etc.; an assimilable source of organic and inorganic nitrogen such as corn steep liquor, soybean powder, cotton seed oil, gluten, peptone, meat extract, yeast extract, yeast casein hydrolysate, etc. and such as ammonium salts, inorganic nitrate and the like. The media further include salts such as phosphate, magnesium, calcium, potassium, sodium, zinc, manganese, or the like.

For carrying out the culture of the organisms for the production of tuberactinomycin, the culturing temperature may be changed generally at the range of temperature in which the microorganism can grow and tuberactinomycin can be produced, preferably at 25–35° C.

The culturing period is, though varies according to the condition employed, generally two to ten days. When the culture broth reveals a highest potency in antibiotic production, the cultivation should naturally be terminated.

Tuberactinomycin is removed from the cultured broth as set forth hereinafter, however, it is almost impossible to extract with water immiscible organic solvents, because of its easily soluble nature in water. Therefore, in industrial manufacture, isolation and purification procedures of tuberactinomycin should be exploited by its basic nature.

According to a preferred procedure, the whole beer is filtered, the tuberactinomycin is precipitated as a dye salt from the filtrate with adding sulfonic acid dye, such as methyl orange, eriochrome violet, Alizarin Red S and the like. The thus formed tuberactinomycin-dye salt is suspended in organic solvents such as methanol, acetone or the like, adding an inorganic acid salt of triethylamine such as triethylamine-hydrochloride, sulfate or the like therein, and precipitating the inorganic acid salt of tuberactinomycin, such as tuberactinomycin-hydrochloride, sulfate or the like. Or alternatively, dye salt of tuberactinomycin is dissolved in aqueous hydrochloric acid, aqueous sulfonic acid or the like, and after the pigment is removed by extraction with water immiscible organic solvents therefrom, the water layer is concentrated, adding an organic solvent such as methanol, acetone or the like therein, thereby precipitating the inorganic acid salt of tuberactinomycin.

In still another way, the most industrially profitable procedure, cation exchange resin is available to isolate the tuberactinomycin from the cultured broth. According to this procedure, tuberactinomycin is held in cation exchange resin, eluted with diluted solution of sulfonic acid, hydrochloric acid, or the like, or with diluted alkaline solution, and the tuberactinomycin active fractions are collected, neutralized, concentrated, added a solvent such as methanol, acetone or the like therein, then salt of tuberactinomycin is precipitated therefrom. Alternatively, the cultured filtrate is dialyzed or gel-filtered to remove high molecular weight substances such as proteinous substances, polysaccharides or the like present in the broth, concentrated by adding an acid, organic solvent being then to precipitate the acid salt of tuberactinomycin.

The thus prepared crude tuberactinomycin salt may preferably be purified by recrystallization by dissolving in water, and admixing therewith a water-miscible organic solvent such as methanol, ethanol, acetone, methylcellosolve, dioxane, tetrahydrofuran or the like. It is also purified by charging a chromatographic column such as cation exchange resin, silica gel, cellulose powder or the like carrier available for tuberactinomycin purification, eluting and collecting the active fractions, further concentrating and adding a solvent thus isolating the material as a salt.

In a still further method for purification of tuberactinomycin salt, the concentrated aqueous solution of tuberactinomycin salt is mixed with excess amounts of aqueous triethylamine sulfate to form tuberactinomycin sulfate, then a large amount of water miscible organic solvent such as methanol, acetone or the like is added to separate the tuberactinomycin sulfate, which is purified by repeating those operations.

In order to obtain the most purified sample of tuberactinomycin, tuberactinomycin hydrochloride is charged on a silica gel thin layer chromatographic plate, which is developed with a solvent mixture of 10% aqueous ammonium acetate, acetone and 10% ammonia water in the ratio of 9:10:0.5 (v./v.) respectively. After finishing the development the one spot sample corresponding to tuberactinomycin hydrochloride is scraped off, dissolved in water and recrystallized with methanol precipitation.

The physical and chemical properties of the most purified tuberactinomycin obtained in accordance with the above-described procedure are as follows:

(1) *Elemental analysis.*—Tuberactinomycin hydrochloride: Found (percent): C, 33.95; H, 5.66; N, 22.69; Cl, 12.40. Theoretical as based upon $C_{16}H_{31}N_9 \cdot 2HCl$ (percent): C, 33.92; H, 5.87; N, 22.25; Cl, 12.51.

Tuberactinomycin free base.—Found (percent): C, 38.78; H, 6.38; N, 25.48. Theoretical as based upon $C_{16}H_{31}N_9$ (percent): C, 38.75; H, 6.11; N, 25.44.

(2) Molecular weight: 473 (by cryoscopic method) 486 (by titration method).

(3) Molecular formula by calculation of found elemental analysis and molecular weight: $C_{16}H_{31}N_9O_9$ or as hydrochloride $C_{16}H_{31}N_9O_9 \cdot 2HCl$.

(4) Melting point. (as tuberactinomycin hydrochloride) 244–264° C. (decomposed, not clearly observed).

(5) Optical rotation as tuberactinomycin hydrochloride: $[\alpha]_D^{25} = -31.5°$ (c.=1, $H_2O$).

(6) Ultraviolet absorption spectrum as a hydrochloride: shown in FIG. 1.

$$\lambda_{max.}: 268 \text{ m}\mu, E_{1\ cm.}^{1\%} = 330 \text{ (in water)}$$

$$\lambda_{max.}: 268.5 \text{ m}\mu, E_{1\ cm.}^{1\%} = 313 \text{ (in 0.1 N—HCl)}$$

$$\lambda_{max.}: 285.5 \text{ m}\mu, E_{1\ cm.}^{1\%} = 206.5 \text{ (in 0.1 N—NaOH)}$$

Figure 2:
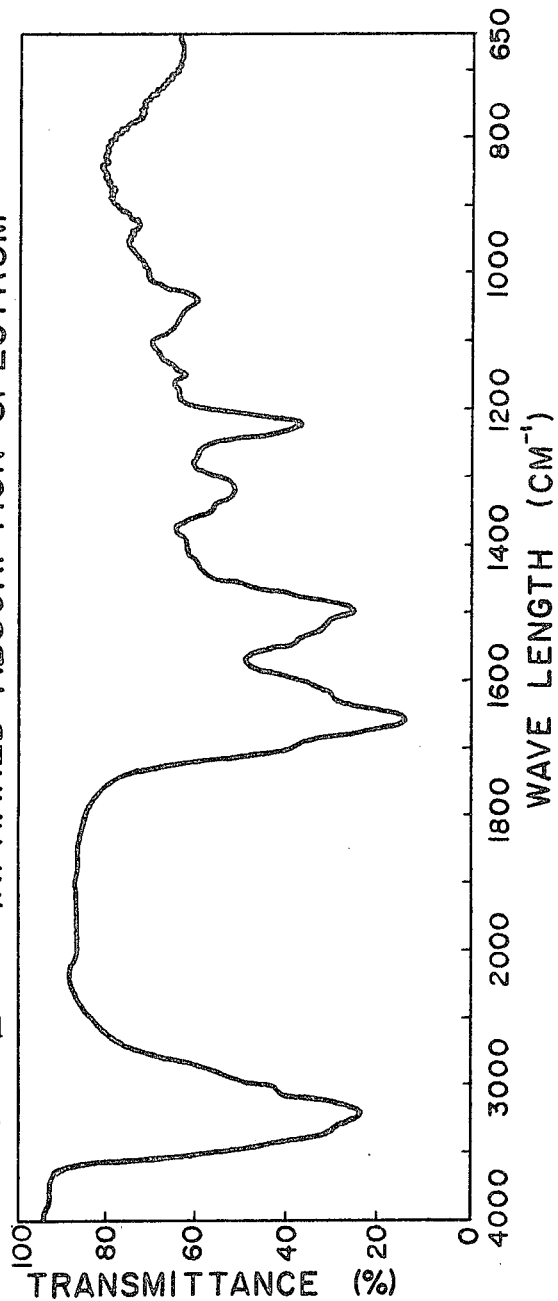
FIG. 2 is a chart showing the infrared absorption spectrum of tuberactinomycin.

(7) Infrared absorption spectrum (KBr tablet): shown in FIG. 2. Characteristic peaks: 3250, 1660, 1495, 1225, 1154 and 1045 cm.$^{-1}$.

(8) Solubility:

Soluble: water.
Weakly soluble: methanol, dimethylformamide, methylcellosolve.
Hardly soluble: ether, chloroform, n-butanol, ethylacetate, dioxane, ethanol, pyridine.
Insoluble: acetone, benzene.

(9) Color reaction:

Positive: ninhydrin, Sakaguchi, biuret.
Negative: isatin, Pauli, Molisch, Elson-Morgan.
Ehrlich: yellow colored.

(10) Basicity: $pka_1=7.2$, $pka_2=10.3$
(11) Appearance: White crystalline powder.

Tuberactinomycin is a peptide antibiotic having anti-tuberculosis activity, being composed of carbon, hydrogen, nitrogen and oxygen, being positive in ninhydrin and Sakaguchi reaction and forming amino acids by hydrolysis.

Figure 3:
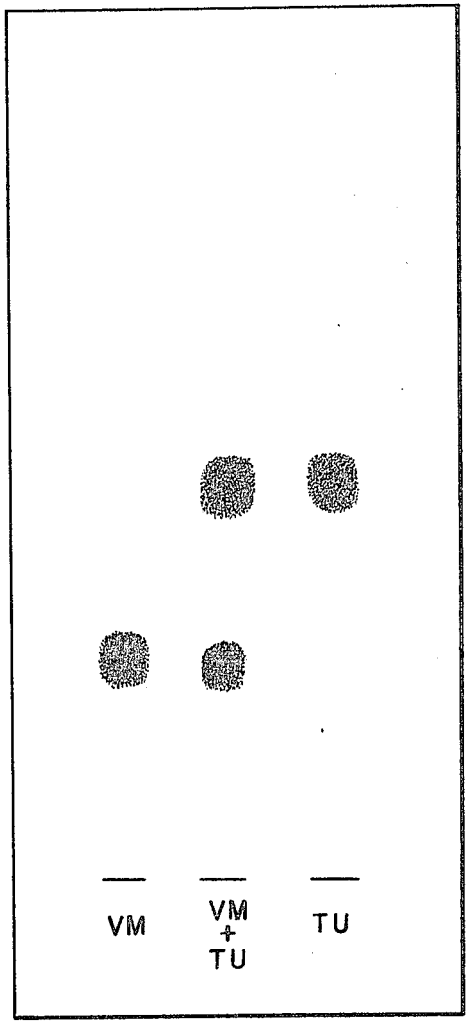
FIG. 3 is a drawing showing the thin layer chromatographic pattern of tuberactinomycin hydrochloride and viomycin hydrochloride.

Among the antibiotics hitherto reported, viomycin, phthiomycin [refer to Maeda, K., et al., J. Antibiotics, Ser. A. 6 (4), 183 (1953), Japan. Pat. Publ., 3096/1955], capreomycin [refer to W. M. Stark, et al., Antimicrob. Agents and Chemoth., 201 (1962)], vinactin [refer to U.S. Patent 2,633,445] and alboverticillin [Maeda, K., et al., J. Antibiotics, 11A, 30 (1958)] may resemble tuberactinomycin as to some of its characteristics. Tuberactinomycin is however different from those antibiotics as follows:

(1) Comparison with viomycin (a) Thin layer chromatography: Tuberactinomycin hydrochloride, viomycin hydrochloride and a mixture thereof are spotted on a silica gel thin layer chromatographic plate, 0.25 millimeter in thickness. The plate is developed with a mixture of solvent consisting of 10% aqueous ammonium acetate, acetone and 10% ammonia water in the ratio of 9:10:0.5 (v./v.) respectively, colored with ninhydrin reagent. As shown in FIG. 3, these two antibiotics are different in their $R_f$ values.

(b) Amino acid analysis of tuberactinomycin hydrochloride and viomycin hydrochloride hydrolyzates: A solution of tuberactinomycin hydrochloride (100 mg.) dissolved in 6 N-HCl (3 ml.) is hydrolyzed in sealed tube at 105° C. for 24 hours. The thus hydrolyzed tuberactinomycin is dried up and analyzed by the Technicon Amino Acid Auto Analyzer (Technicon Chromatography Corp., New York, U.S.A.), coloring with 2,4,6-trinitrobenzenesulfonic acid.

Figure 4A:
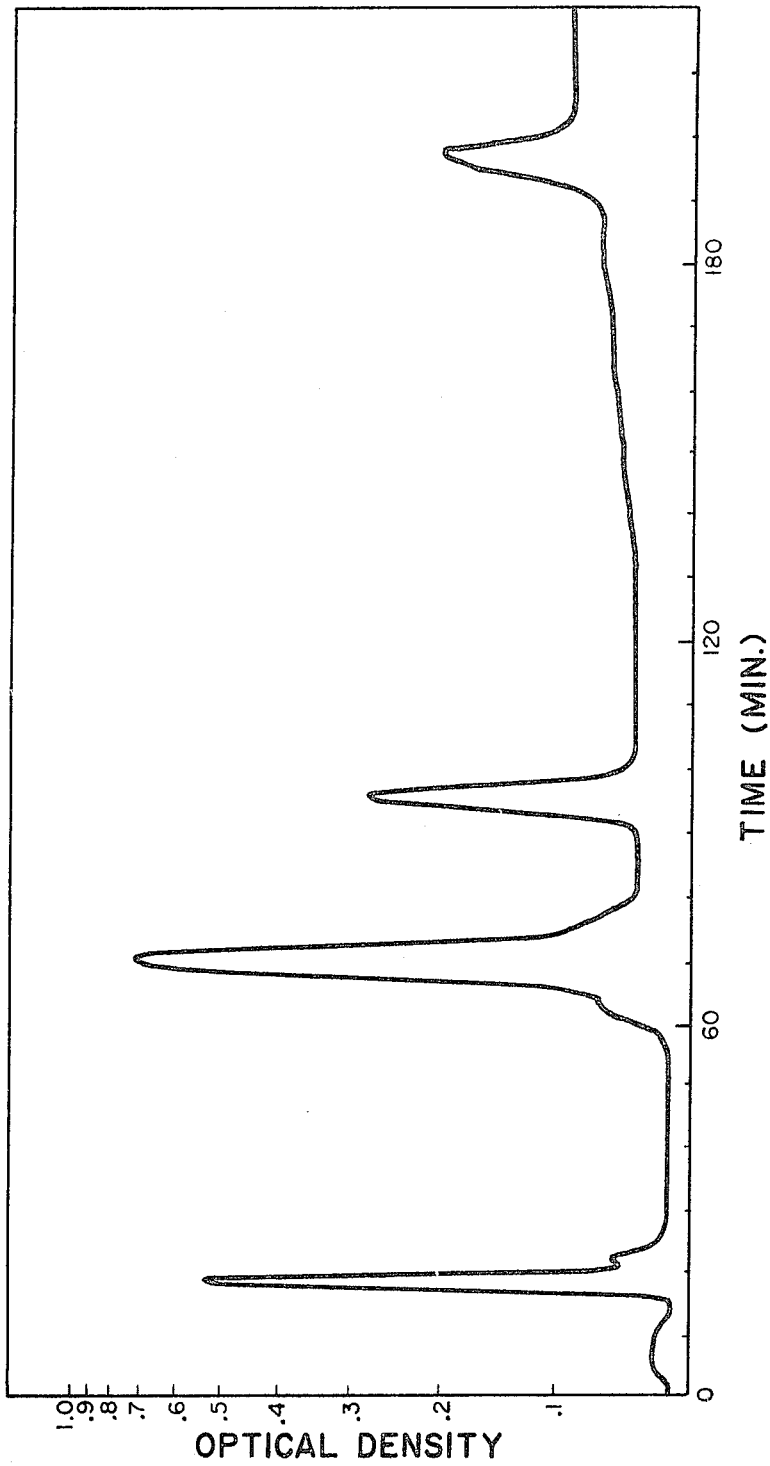
FIGS. 4(A) and (B) are a chart showing the amino acid analytical pattern of tuberactinomycin hydrochloride and viomycin hydrochloride.
Figure 4B:
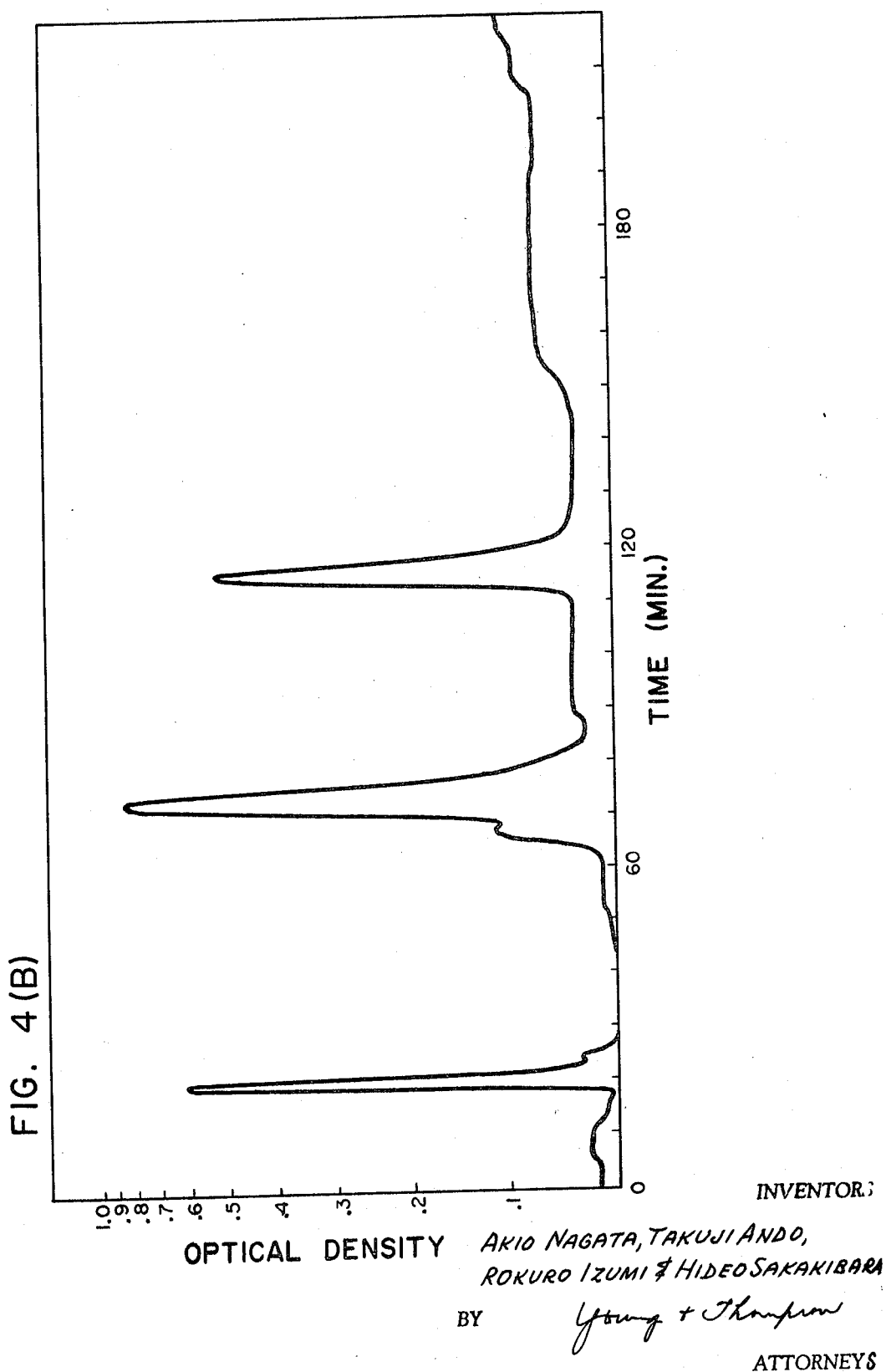

Viomycin hydrochloride is also hydrolyzed and analyzed by the same way. As illustrated in FIG. 4(A) (for tuberactinomycin) and (B) (for viomycin), these two antibiotics consist of partially different amino acids.

As is known with the description hereinabove, tuberactinomycin is different from viomycin.

(2) Comparison with alboverticillin

Alboverticillin has no ultraviolet absorption spectrum peak at 220-320 m$\mu$., whereas tuberactinomycin shows a peak at 268 m$\mu$.

(3) Comparison with capreomycin

Capreomycin shows negative Sakaguchi reaction and molecular formula of $C_{25-27}H_{45-49}N_{13-14}O_{9-10}$, whereas tuberactinomycin shows positive Sakaguchi reaction and different molecular formula as described hereinbefore.

(4) Comparison with vinactin

Vinactin shows different amino acid composition from tuberactinomycin.

(5) Comparison with phthiomycin

Ratio of $$E_{1\,cm.}^{1\%}$$

in 0.1 N—HCl (=171) and in 0.1 N—NaOH (=157) of phthiomycin hydrochloride is 1.09, whereas the corresponding ratio of tuberactinomycin hydrochloride is 1.52, showing the differences of both antibiotics.

As illustrated hereinbefore, tuberactinomycin is a new and novel antibiotic different from the antibiotics hitherto known in the prior arts.

Biological properties of tuberactinomycin are as follows:

(1) Acute toxicity of tuberactinomycin sulfate $LD_{50}$=185-200 mg./kg. (ddY strain mouse, i.p.)
$LD_{50}$=183 mg./kg. (ddY strain mouse, i.v.)
$LD_{50}$=505 mg./kg. (ddY strain mouse, i.m.)

(2) Antimicrobial spectrum in agar streak dilution method

| Organism | Minimum inhibitory concentration ($\gamma$/ml.) |
|---|---|
| *Aspergillus niger* ATCC 6275 | >200 |
| *Penicillium crysogenum* Q 176 | 200 |
| *Trichophyton asteroides* | >200 |
| *Trichophyton rubrum* | 100 |
| *Microsporum gypseum* | 50 |
| *Cryptococcus neoformans* | >200 |
| *Candida albicans* ATCC 7491 | >200 |
| *Torula utilis* | >200 |
| Trichoderma I-I ATCC 9645 | >200 |
| *Saccharomyces dreusiae* | >200 |
| *Sarcina lutea* ATCC 1001 | 100 |
| *Shigella sonnei* | >100 |
| *Shigella flexineri* | 12.5 |
| *Salmonella paratyphi* A | 25 |
| *Salmonella paratyphi* B | 100 |
| *Shigella dysenteriae* | 100 |
| *Micrococcus flavus* | 25 |
| *Vibrio comma* | >100 |
| *Nocardia asteroides* | 50 |
| *Pseudomonas aeruginosa* | 12.5 |
| *Escherichia coli* NIHJ | 25 |
| *Staphylococcus aureus* FDA 209P | 50 |
| *Staphylococcus albus* | >100 |
| *Staphylococcus citreus* | 50 |
| *Bacillus subtilis* PCI 219 | 12.5 |
| *Mycobacterium tuberclosis* $H_{37}Rv$ | 4.0 |
| *Mycobacterium* ATCC 607 | 12.5 |
| *Mycobacterium phlei* | 3.2 |

(3) Experimental chemotherapeutic effect in mice:

Four groups of ten ddY strain mice, male, weighed 20 g., infected intravenously with pathogenic tuberculous bacilli, strain $H_{37}Rv$, were treated with tuberactinomycin hydrochloride, 1 mg./mouse/day, 2 mg./mouse/day, 4 mg./mouse/day and 8 mg./mouse/day, for each group respectively, administered intramuscularly after three days infection. Treatment was continuously received for three weeks. One group of ten mice was administered physiological saline as a control group.

All of the control group died within 22 to 24 days after infection, however, treated groups were survived 24 days after infection. Result observed at 48th day after infection are shown in the following table.

| Dose (mg./mouse/day) | Number of mice treated | Survival ratio dead/treated | Mean weight of lungs (mg.) [1] |
|---|---|---|---|
| 8 | 10 | 0/10 | 616 |
| 4 | 10 | 0/10 | 662 |
| 2 | 10 | 4/10 | 777 |
| 1 | 10 | 5/10 | 869 |
| Control | 10 | 10/10 | 1,003 |

[1] Biopsied at 48th day after infection (for survival mice) or immediately after death (for non-survival mice).

Following examples are only for illustration of the process and products of the present invention but are not to be construed as limiting. All percentages are by weight and all solvent mixture proportions are by volume unless otherwise noted.

EXAMPLE 1

Two liters of an aqueous medium consisting of glucose 3%, starch 2%, soybean meal 3% and sodium chloride 1.5% were equally divided and introduced into twenty 100-milliliter Ehrlenmeyer flasks, adjusted to pH 6, sterilized at 120° C. for 30 minutes, inoculated with *Streptomyces griseoverticillatus* var. *tuberacticus* and then rotatively shake-cultured (radius 25 cm., 330 r.p.m.) at 30° C. for 7 days, obtaining 1.5 l. of cultured broth containing 1,140 mcg./ml. of tuberactinomycin.

Filtered broth was passed at 5 ml./min. through a resin column (2.5 cm. diameter, 30 cm. length) packed with 150 ml. of ion exchange resin Amberlite IRC-50 sodium type (Rohm and Haas Co., U.S.A.) The column was washed with water, eluted with 0.5 N—HCl at a flow rate 1.6 ml./min. The eluates were fractionated each 10 ml., and tuberactinomycin activity was found at fractions Nos. 47-67 observed by ultraviolet absorption method and bioassay.

The thus yielded active fraction, about 200 ml., was neutralized with sodium hydroxide, concentrated to about 10 ml. in vacuo, separating the precipitated inorganic salts therefrom. After decolorization with active carbon, 100 ml. of methanol was added, the mixture was allowed to stand overnight at 5° C. and the precipitate was collected by filtration. The precipitate was washed with methanol and dried in vacuo to yield crude tuberactinomycin hydrochloride, (yield; 1.34 g., purity; 70%, recovery; 55%).

EXAMPLE 2

In Example 1, the aqueous medium was replaced by the medium consisting of glucose 3%, starch 2%, molasses 1.5%, soy bean meal 1.5% and sodium chloride 1.5%, adjusted to pH 6.0, to obtain cultured broth 1.5 l. containing 1950 mcg./ml. of tuberactinomycin. Tuberactinomycin hydrochloride was yielded as a crude sample, (yield; 2.34 g., purity; 70.5%, recovery; 56%). Tuberactinomycin hydrochloride obtained was dissolved in 5 ml. water and adjusted to about pH 8–10 with 0.1 N—NaOH. The solution was concentrated in vacuo and the precipitated sodium chloride was removed, thus tuberactinomycin free base was provided by addition of methanol, (yield; 1.5 g.)

EXAMPLE 3

In Example 1, the medium was replaced by the following: glucose 2%, starch 3%, dry yeast 1.4% and sodium chloride 0.5%, to obtain 1 l. of the cultured broth consisting of 1575 mcg./ml. of tuberactinomycin and to yield 1.11 g. of crude tuberactinomycin hydrochloride, (purity 71%, recovery 57%).

EXAMPLE 4

100 ml. of aqueous medium consisting of starch 1%, molasses 1%, peptone 1%, meat extract 1% and sodium chloride 0.5% were introduced into a 500 ml. Sakaguchi flask, adjusted to pH 7.0, sterilized at 120° C. for 30 minutes, inoculated with Streptomyces griseoverticillatus var. tuberacticus and then cultured with reciprocatory shaking, 7 cm. stroke, 130 reciprocations per minute, at 30° C. for 2 days. The fermented broth was inoculated into 20 l. of aqueous medium, consisting of starch 1%, molasses 1%, peptone 1%, meat extract 1%, sodium chloride 0.5% and antifoaming agent 5 ml. (Uniol D–2000, Nissan Oil Co., Ltd., Tokyo), in 30 l. jar fermenter, and cultured at 30° C. for 24 hours, with aeration 20 l./min., agitation 200 r.p.m. After the 24 hours fermentation, the broth was introduced into 200 l. of sterilized aqueous medium comprising starch 3%, glucose 2%, molasses 1.5%, defatted soy bean meal 1.5%, sodium chloride 0.5% and antifoaming agent 100 ml. (pH 6.0, before sterilization), in 250 l. stainless steel fermentation tank, and cultured at 30° C. for 90 hours with aeration 100 l./min., agitation 300 r.p.m. to obtain cultured broth 190 l. consisting of 2,100 mcg./ml. of tuberactinomycin.

The cultured broth was adjusted to pH 2.0 with hydrochloric acid and there was added thereto 25% by volume of diatomaceous earth, and the mixture was filtered at reduced pressure to obtain 160 l. of filtered broth. After neutralization, the filtrate was passed through the resin tower, consisting of 15 l. of ion exchange resin IRC–50 (Na-type), at flow rate 30 l./hour to absorb the tuberactinomycin contained therein. The resin was washed with water, then eluted with 1 N-hydrochloric acid at the flow rate 5 l./hour, fractionated each 25 l., and there was found the tuberactinomycin within the fractions Nos. 7–12. The active fraction was concentrated to about 500 ml. in vacuo after neutralization with sodium hydroxide. The thus obtained concentrate was decolored with active charcoal and methanol was added with stirring therein; the mixture was permitted to stand overnight at 5° C., to precipitate the tuberactinomycin. Tuberactinomycin was washed with methanol, dried over phosphorus pentoxide in vacuo, to yield the crude tuberactinomycin hydrochloride, (yield; 320 g., purity; 70.5%, recovery; 67.3%).

EXAMPLE 5

Fermentation was conducted by the same process as in Example 2 to obtain 20 l. of cultured broth with 1900 mcg./ml. of tuberactinomycin contained therein.

The broth was adjusted to pH 2.0 with sulfuric acid, then filtered after adding a small amount of filter-aid to provide 1.76 l. of clear filtrate, which was adjusted to pH 5.5, 15 g. of eriochrome violet being added, dialysed for 1.5 hours, filtering the precipitate thereafter. The precipitated dye salt of tuberactinomycin was dried in vacuo after washing with water. The thus prepared dye salt of tuberactinomycin was suspended in 300 ml. of mixture of 80% acetone and 20% of methanol, then 50% methanol solution of triethylamine sulfate was added until no more precipitate of tuberactinomycin sulfate was formed. After stirring the mixture for 1.5 hours, the precipitate was collected by filtration, washed with acetone and methanol to remove dye, dissolved in a small amount of water and the tuberactinomycin sulfate precipitated by the addition of methanol (yield, 2.97 g.; purity, 80%; recovery, 60%).

EXAMPLE 6

100 mg. of tuberactinomycin hydrochloride obtained in Example 1 were dissolved in 5 ml. of solution comprising n-butanol:pyridine:acetic acid:water (15:10:3:12, v./v.) and the solution was absorbed on a cellulose powder column (1 cm. x 150 cm.) in the same solvents mixture. Then, the same solvent mixture was passed through the column at a flow rate of 10 ml./hour. The eluate was collected in each 3 ml. fraction. Tuberactinomycin was found within the fractions Nos. 41–51. The active fraction was concentrated to 1 ml. in vacuo and 5 ml. of methanol added to yield 60 mg. of tuberactinomycin sulfate.

EXAMPLE 7

Ten liters of ion exchange resin CG–50, ammoniacal form, was packed in a stainless steel column (13 cm. x 70 cm.). The resin was buffered overnight with 0.6 M ammonium formate, pH 9.0. 100 g. of tuberactinomycin bulk dissolved in 500 ml. of ammonium formate, pH 9.0, was charged in the top of the aforesaid column, then eluted with the same buffer solution at a flow rate of 6–8 l./hour. Each 2 l. fraction was collected using a fraction collector. Activity was found within the fractions Nos. 25 to 36, which were then neutralized with hydrochloric acid, and the active solution was chromatographed in a column of IRC–50, sodium form (4 cm. x 54 cm.), and eluted with 1 N hydrochloric acid at a flow rate of 350 ml./hour. The active fraction was collected, neutralized with hydrochloric acid thereafter, concentrated to 200 ml. in vacuo, and 2 l. of methanol were added to precipitate the tuberactinomycin hydrochloride as a white powder. The precipitate was filtered and dried in vacuo to yield 50 g. of white crystalline powder tuberactinomycin hydrochloride.

We claim:
1. Tuberactinomycin, said antiobiotic substance being characterized as follows:
 (a) said substance containing the elements carbon, hydrogen, nitrogen and oxygen in the following proportions upon analysis found:

| | Percent |
|---|---|
| Carbon | 38.78 |
| Hydrogen | 6.38 |
| Nitrogen | 25.48 |
| Oxygen by difference | 29.36 |

(b) said substance having a molecular weight of 473 by the cryoscopic method and 486 by the titration method,
 (c) said substance having a molecular formula of $$C_{16}H_{31}N_9O_9$$

by the calculation of found elemental analysis and molecular weight, (d) said substance as a hydrochloride having a melting point of about 244 to 264° C. (decomposed),
(e) said substance as a hydrochloride having an optical rotation $[\alpha]_D^{25} = -31.5°$ (c.=1, $H_2O$),
(f) said substance as a hydrochloride having an ultraviolet absorption peak of $$\lambda_{max.} = 268 \text{ m}\mu, \text{ E}_{1\text{ cm.}}^{1\%} = 330 \text{ (in } H_2O)$$

$$\lambda_{max.} = 268.5 \text{ m}\mu, \text{ E}_{1\text{ cm.}}^{1\%} = 313 \text{ (in 0.1 N—HCl)}$$

$$\lambda_{max.} = 285. \text{ m}\mu, \text{ E}_{1\text{ cm.}}^{1\%} = 206.5 \text{ (in 0.1 N—NaOH)}$$

and exhibiting a characteristic ultraviolet absorption spectrum as shown in FIG. 1 of the drawings,
(g) said substance when suspended in a potassium bromide pellet having characteristic infrared absorption peaks at about 3250, 1660, 1495, 1225, 1154 and 1045 cm.$^{-1}$, and exhibiting a characteristic infrared absorption spectrum as shown in FIG. 2 of the drawings,
(h) said substance being soluble in water, weakly soluble in methanol, dimethylformamide and methylcellosolve, hardly soluble in ether, chloroform, n-butanol, ethylacetate, dioxane, ethanol and pyridine and insoluble in acetone and benzene,
(i) said substance having a basic character of
$$pka_1 = 7.2 \text{ and } pka_2 = 10.3$$
and
(j) said substance being white in color.

2. A composition of matter consisting essentially of tuberactinomycin as defined in claim 1.

3. The process for production of tuberactinomycin as defined in claim 1 which comprises cultivating *Streptomyces griseoverticillatus* var. *tuberacticus* NRRL 3482 in an aqueous nutrient medium under aerobic conditions until substantial antibiotic activity is imparted to said medium.

4. The process for production of tuberactinomycin as defined in claim 1 which comprises cultivating *Streptomyces griseoverticillatus* var. *tuberacticus* NRRL 3482 in an aqueous nutrient medium under aerobic conditions until substantial antibiotic activity is imparted to said medium and isolating tuberactinomycin from the culture medium, said tuberactinomycin in its essentially crystalline powder form being characterized as in claim 1.

5. The process according to claim 3 in which the culture medium is maintained at a temperature of about 18° C. to 37° C., and the growth of the organism is carried out for a period of about 2 to 10 days.

References Cited

Nagata et al., J. of Antibiotics, vol. XXI, No. 12, 1968, pp. 681–687.

Derwent Farmdoc #36350, N.E. 68, 11677, published Feb. 19, 1969, pp. 77–92.

Japan Medical Gazette, p. 10, Feb. 20, 1969.

JEROME D. GOLDBERG, Primary Examiner

U.S. Cl. X.R.

195—80